United States Patent
Chien et al.

(10) Patent No.: US 11,303,863 B2
(45) Date of Patent: Apr. 12, 2022

(54) PROJECTION SYSTEM, PROJECTION IMAGE ADJUSTING METHOD AND PROJECTOR

(71) Applicant: Coretronic Corporation, Hsin-Chu (TW)

(72) Inventors: Chun-Lin Chien, Hsin-Chu (TW); Yu-Kuan Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/867,565

(22) Filed: May 6, 2020

(65) Prior Publication Data
US 2020/0358991 A1 Nov. 12, 2020

(30) Foreign Application Priority Data
May 10, 2019 (CN) .......................... 201910388563.5

(51) Int. Cl.
*H04N 9/31* (2006.01)

(52) U.S. Cl.
CPC ................................ *H04N 9/3185* (2013.01)

(58) Field of Classification Search
CPC .......................... H04N 9/3185; H04N 9/3142
USPC ........................................................ 348/745
See application file for complete search history.

(56) References Cited

U.S. PATENT DOCUMENTS

| 5,883,476 | A | * | 3/1999 | Noguchi | G09G 1/00 |
| | | | | | 315/368.12 |
| 8,750,646 | B2 | | 6/2014 | Yoshimura | |
| 2003/0222892 | A1 | * | 12/2003 | Diamond | H04N 9/31 |
| | | | | | 345/647 |
| 2008/0155463 | A1 | * | 6/2008 | Lian | G06F 3/04855 |
| | | | | | 715/786 |
| 2011/0234994 | A1 | * | 9/2011 | Uchiyama | H04N 9/3185 |
| | | | | | 353/70 |

(Continued)

FOREIGN PATENT DOCUMENTS

| CN | 103034029 | 4/2013 |
| CN | 104346779 | 2/2015 |

(Continued)

OTHER PUBLICATIONS

"Office Action of China Counterpart Application", dated Aug. 17, 2021, p. 1-p. 8.

*Primary Examiner* — Michael Lee
(74) *Attorney, Agent, or Firm* — JCIPRNET

(57) ABSTRACT

A projection system, a projection image adjusting method and a projector are provided. The projection system includes a projector and a control unit. The projector projects a projection image. The control unit controls movement of an image grid point of the projection image projected by the projector. When the projector receives a continuous adjustment signal output by the control unit, the projector determines a cumulative displacement amount proportional to a continuous signal quantity cumulative value according to the continuous signal quantity cumulative value of the continuous adjustment signal, and the image grid point is moved by the projector according to the cumulative displacement amount to correspondingly deform at least a part of the projection image, so as to provide a convenient projection image adjustment effect.

21 Claims, 3 Drawing Sheets

(56) References Cited

U.S. PATENT DOCUMENTS

| | | | | |
|---|---|---|---|---|
| 2015/0026619 A1* | 1/2015 | Lee | ................... | G06F 3/0485 |
| | | | | 715/769 |
| 2015/0338724 A1* | 11/2015 | Tsukagoshi | .......... | G03B 21/147 |
| | | | | 353/69 |
| 2016/0034130 A1* | 2/2016 | Li | ................... | G06F 3/04845 |
| | | | | 715/769 |
| 2016/0188195 A1* | 6/2016 | Chen | ................ | H04N 9/3185 |
| | | | | 715/765 |
| 2016/0227180 A1 | 8/2016 | Ishii | | |
| 2016/0330420 A1* | 11/2016 | Yoshimura | .............. | G06T 11/60 |
| 2018/0139427 A1* | 5/2018 | Mori | ................ | H04N 9/3147 |

FOREIGN PATENT DOCUMENTS

| | | |
|---|---|---|
| CN | 106101677 | 11/2016 |
| CN | 108012129 | 5/2018 |
| JP | 2004147064 | 5/2004 |
| TW | 200419295 | 10/2004 |

\* cited by examiner

PROJECTION SYSTEM, PROJECTION IMAGE ADJUSTING METHOD AND PROJECTOR

CROSS-REFERENCE TO RELATED APPLICATION

This application claims the priority benefit of China application serial no. 201910388563.5, filed on May 10, 2019. The entirety of the above-mentioned patent application is hereby incorporated by reference herein and made a part of this specification.

BACKGROUND

Technical Field

The invention relates to a projection operation, and particularly relates to a projection system, a projection image adjusting method and a projector.

Description of Related Art

Along with increasing demand for projection, how to design a projector to have a convenient adjustment function is one of the important research and development directions in the field of projectors. For example, when a projection target, such as a wall or screen, is not planar, or a placing position of the projector is not parallel to the projection target, a result of an initial projection image projected by the projector may have an abnormal image range, which, for example, presents a trapezoidal shape, so that the initial projection image does not present a projection range and a shape expected by a user. Therefore, a conventional method for adjusting the range of the projection image is implemented through complicated projector setting or manual adjusting of a position of the projector, so as to adjust the projection range of the projection image projected by the projector, which leads to increase of a setup time and adjusting time of the projector. Therefore, regarding how to make the projector providing a convenient adjustment function, solutions of several embodiments are provided below.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a projection system, a projection image adjusting method and a projector, which are adapted to provide a convenient projection image adjusting effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to achieve one or a portion of or all of the objects or other objects, an embodiment of the invention provides a projection system including a projector and a control unit. The projector is configured to project a projection image. The control unit is coupled to the projector. The control unit is configured to control movement of an image grid point of the projection image projected by the projector. When the projector receives a continuous adjustment signal output by the control unit, the projector determines a cumulative displacement amount proportional to a continuous signal quantity cumulative value according to the continuous signal quantity cumulative value of the continuous adjustment signal, and the image grid point is moved by the projector according to the cumulative displacement amount to correspondingly deform at least a part of the projection image.

In order to achieve one or a portion of or all of the objects or other objects, an embodiment of the invention provides a projection image adjusting method adapted to a projection system. The projection system includes a projector and a control unit. The control unit controls movement of an image grid point of a projection image projected by the projector. The projection image adjusting method includes following steps: when the projector receives a continuous adjustment signal output by the control unit, determining a cumulative displacement amount proportional to a continuous signal quantity cumulative value by the projector according to the continuous signal quantity cumulative value of the continuous adjustment signal; and moving the image grid point by the projector according to the cumulative displacement amount to correspondingly deform at least a part of the projection image.

In order to achieve one or a portion of or all of the objects or other objects, an embodiment of the invention provides a projector including a projection optical engine and a control processing unit. The projection optical engine is configured to project a projection image. The control processing unit is coupled to the projection optical engine. The control processing unit is configured to control movement of an image grid point of the projection image projected by the projection optical engine. When the control processing unit receives a continuous adjustment signal output by a control unit, the control processing unit determines a cumulative displacement amount proportional to a continuous signal quantity cumulative value according to the continuous signal quantity cumulative value of the continuous adjustment signal. The image grid point is moved by the control processing unit according to the cumulative displacement amount to correspondingly deform at least a part of the projection image.

Based on the above description, the embodiments of the invention have at least one of following advantages or effects. The projection system, the projection image adjusting method and the projector of the invention may determine to move the image grid point of the projection image in a cumulative displacement manner according to whether the control signal received by the projector is the continuous adjusting signal, such that at least a part of the projection image is correspondingly deformed along with movement of the image grid point.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "left," "right," "front," "back," etc., is used with reference to the orientation of the Figure(s) being described and are not intended to be limiting of the invention.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
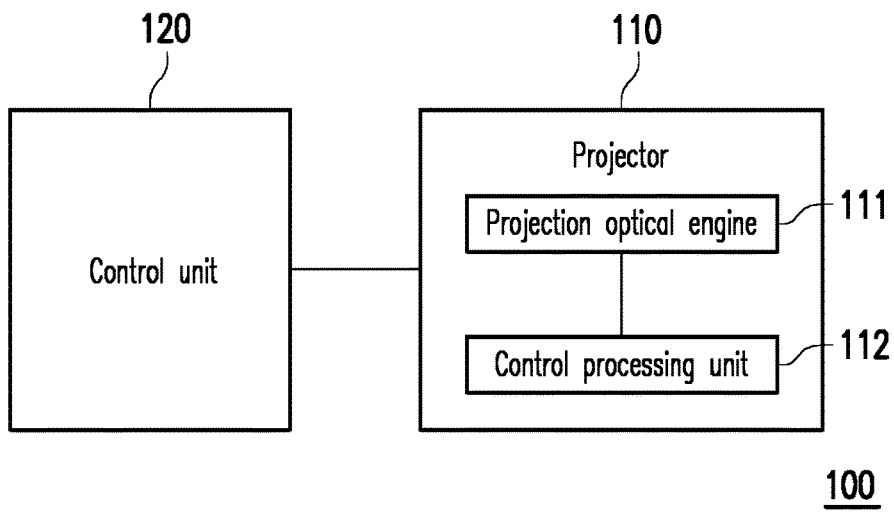
FIG. 1 is a schematic diagram of a projection system according to an embodiment of the invention.

FIG. 1 is a schematic diagram of a projection system according to an embodiment of the invention. Referring to FIG. 1, the projection system 100 includes a projector 110 and a control unit 120. The projector 110 includes a projection optical engine 111 and a control processing unit 112. The projection optical engine 111 is coupled to the control processing unit 112. In the embodiment, the projector 110 may be coupled to the control unit 120 through a wired or wireless manner. For example, in an embodiment, the control unit 120 is an additional device, for example, a remote controller, a mobile device, or a computer, which allows a user to remotely control the projector 110. However, the control unit 120 of the invention is not limited to the form of additional device. For another example, in another embodiment, the control unit 120 may be a control interface, for example, a keypad of the projector 110, and may be integrated to an appearance of the projector 110, such that the user may operate keys on the keypad of the projector 110 to control the projector 110.

In the embodiment, the projection optical engine 111, for example, includes a light source module, an optical engine module, a lens module and related optical and circuit control components, etc., which is not limited by the invention. In the embodiment, the control processing unit 112 may be a hardware circuit designed through Hardware Description Language (HDL) or any other digital circuit design method well known by those skilled in the art, and implemented through a Field Programmable Gate Array (FPGA), a Complex Programmable Logic Device (CPLD) or an Application Specific Integrated Circuit (ASIC). The control processing unit 112 is configured to operate the projection optical engine 111 to project a projection image. Moreover, the control unit 120 of the embodiment may be another hardware circuit similar to the control processing unit 112, or a control interface. For example, the control unit 120 may be a hardware circuit designed through HDL or any other digital circuit design method well known by those skilled in the art, and implemented through a FPGA, a CPLD or an ASIC.

In the embodiment, the control processing unit 112 may receive a control signal output by the control unit 120 to control the projector 110 to perform a corresponding operation. The control unit 120 may, for example, include a plurality of direction units, and the direction units may be physical or virtual direction keys. To be specific, after the control unit 120 selects a certain image grid point on the projection image, the control unit 120 may output an adjusting signal corresponding to one of the direction units to the control processing unit 112 to adjust a position of the certain image grid point on the projection image. Moreover, when the certain image grid point is moved, a range of the projection image is correspondingly changed, and the content of the projection image is accordingly changed. A detailed adjusting method is introduced below with reference of a following embodiment.

Figure 2:
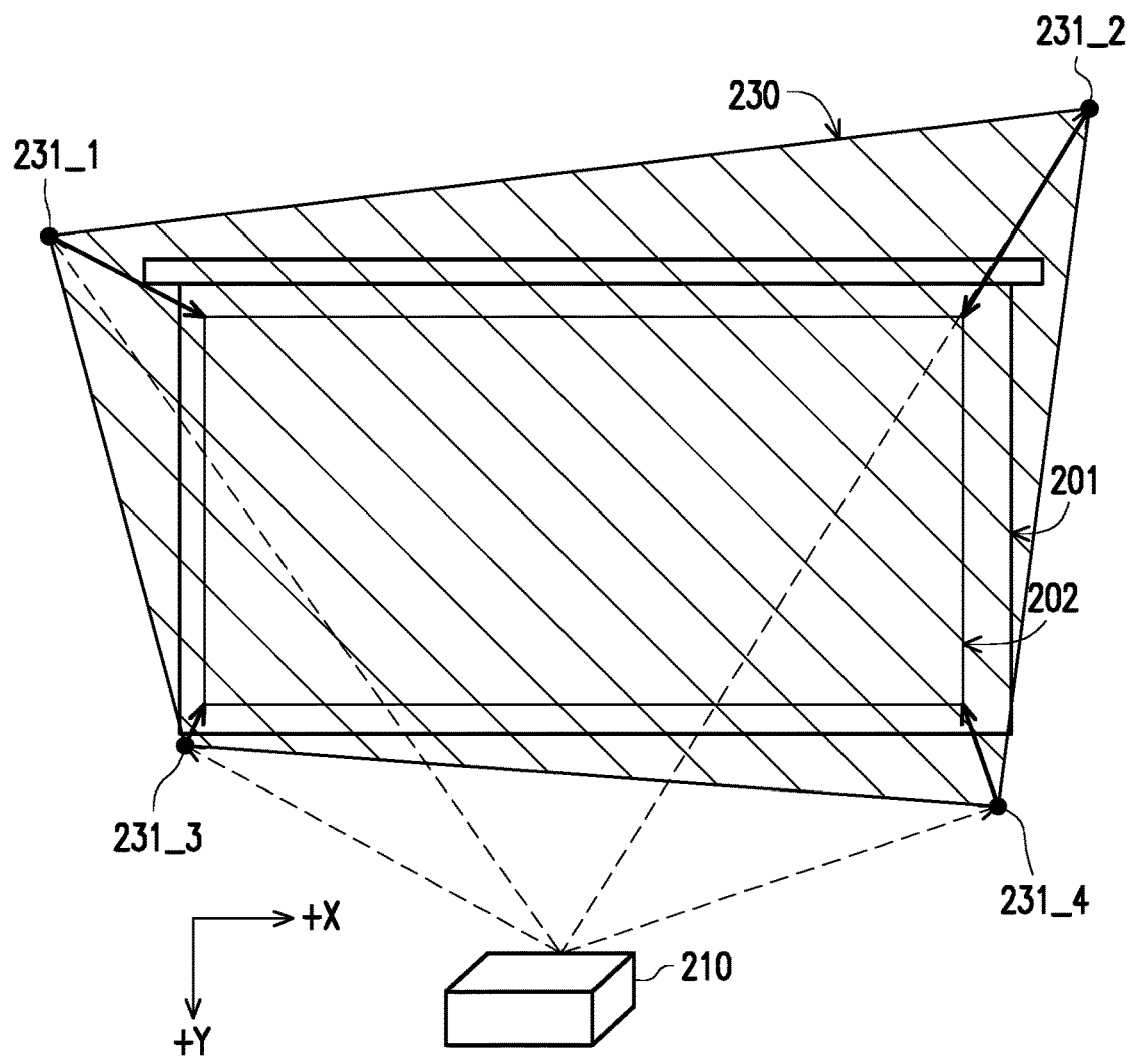
FIG. 2 is a schematic diagram of adjusting a projection image according to an embodiment of the invention.

FIG. 2 is a schematic diagram of adjusting a projection image according to an embodiment of the invention. Referring to FIG. 2, a projector 210 projects a projection image 230 onto a projection screen 201. In the embodiment, when the projection screen 201 is non-planar or because a placing position of the projector 210 is not parallel with the projection screen 201 or a projection direction of the projector 210 is upward or downward to make an initial projection image 230 to be not fully located within a range of the projection screen 201, the user may operate the projector 210 through the control unit to adjust a range of the projection image 230. In the embodiment, the projection image 230 includes four image grid points 231_1-231_4, and the image grid points 231_1-231_4 respectively correspond to four corners of the projection image 230.

Referring to FIG. 1, taking a normal operation method as an example, when the user presses a certain direction unit located on the control unit 120 once, the projector 110 may receive a normal adjustment signal output by the control unit 120. A corresponding certain image grid point in the plurality of image grid points 231_1-231_4 on the projection image 230 may be adjusted/moved by the projector 110 according to the normal adjustment signal, such that the certain image grid point is moved by a predetermined displacement amount towards a moving direction corresponding to the certain direction unit, and at least a part of the image content of the projection image 230 is correspondingly deformed. In the embodiment, the predetermined displacement amount may be a pixel distance, which is not limited by the invention.

Taking a special operation as an example, when the user continuously presses the certain direction unit (or continuously presses the same by a plurality of times within a short time), the projector 110 may receive a continuous adjustment signal output by the control unit 120. A corresponding certain image grid point in the plurality of image grid points 231_1-231_4 on the projection image 230 may be continuously moved by the projector 110 according to the continuous adjustment signal, such that the certain image grid point is continuously moved by a plurality of cumulative displacement amounts towards a moving direction corresponding to the certain direction unit, and at least a part of the image content of the projection image 230 is correspondingly deformed continuously. In the above example, the plurality of cumulative displacement amounts may be respectively determined according to a respective continuous signal quantity cumulative value, and the plurality of cumulative displacement amounts respectively proportional to the respective continuous signal quantity cumulative values. However, in other embodiments, the plurality of cumulative displacement amounts may also be increased sequentially in a manner of arithmetic progression, geometric progression or according to a plurality of predetermined increments. Moreover, the plurality of cumulative displacement amounts are gradually increased values, so that the aforementioned predetermined displacement amount is smaller than the cumulative displacement amounts.

Further, coordinates of the image grid point 231_1 are, for example, (X1, Y1). After the user selects the image grid point 231_1 of the projection image 230 through the control unit, firstly, the user may press a rightward direction unit (toward a +X direction) in a continuous pressing manner, and the image grid point 231_1 is continuously displaced rightward correspondingly. Moreover, corresponding to a time length that the user continuously presses the direction unit, the image grid point 231_1 is, for example, continuously displaced rightward by 6 times. In the other words, cumulative displacement amounts of the image grid point 231_1 moved rightward is 6. In this case, 6 cumulative displacement amounts of the image grid point 231_1 continuously displaced rightward are proportional to the continuous signal quantity cumulative value. In this example, the 6 cumulative displacement amounts may be increased in the manner of geometric progression, so that the 6 cumulative displacement amounts may be sequentially 1, 2, 4, 8, 16 and 32 pixel distances. Therefore, after the continuous displacement of the image grid point 231_1, a position of the image grid point 231_1 may be displaced to a position with coordinates of (X1+63, Y1).

Then, the user may press a downward direction unit (toward a +Y direction) in the continuous pressing manner, and the image grid point 231_1 is continuously displaced downward correspondingly. Moreover, corresponding to a time length that the user continuously presses the direction unit, the image grid point 231_1 is, for example, continuously displaced downward by 5 times. In this case, 5 cumulative displacement amounts of the image grid point 231_1 continuously displaced downward is proportional to the continuous signal quantity cumulative value. In this example, the 5 cumulative displacement amounts may also be increased in the manner of geometric progression, so that the 5 cumulative displacement amounts may be sequentially 1, 2, 4, 8 and 16 pixel distances. Therefore, after the continuous displacement of the image grid point 231_1, the position of the image grid point 231_1 may be further displaced to a position with coordinates of (X1+63, Y1+31). Deduced by analogy, the image grid points 231_2-231_4 may be respectively moved, such that the range of the projection image 230 may be adjusted to be aligned with an expected projection region 202 within the projection screen 201.

However, the manner of increasing the cumulative displacement amount of the invention is not limited to the above example. In an embodiment, besides that the cumulative displacement amount is increased in the manner of geometric progression, it also has an upper limit value. Taking the aforementioned rightward movement as an example, if the upper limit value is 8 pixel distance, the 6 cumulative displacement amounts of the aforementioned example may be sequentially 1, 2, 4, 8, 8, 8 pixel distances, and after the continuous movement of the image grid point 231_1, the position of the image grid point 231_1 may be displaced to the position with coordinates of (X1+31, Y1). Moreover, in another embodiment, the manner of increasing the cumulative displacement amount of the invention may also be arithmetic progression or according to a plurality of predetermined increments, or even according to a plurality of random increments. Moreover, regarding how the projector 210 determines whether the adjustment signal received from the control unit is the normal adjustment signal or the continuous adjustment signal, description is made below with reference of an embodiment of FIG. 4.

Figure 3:
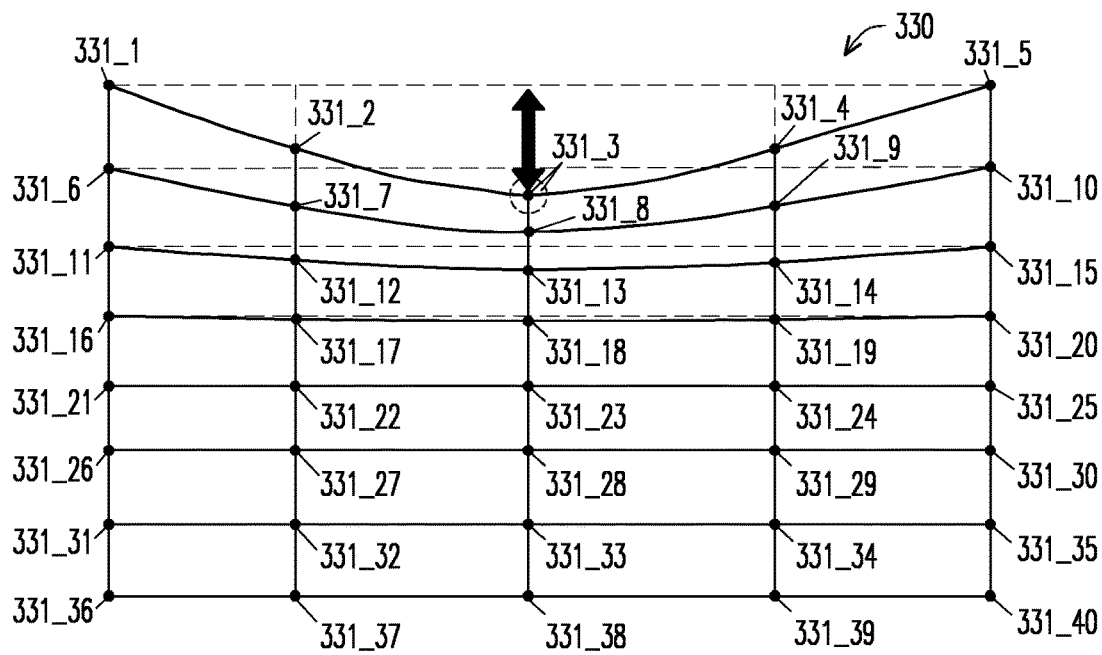
FIG. 3 is a schematic diagram of image deformation adjustment according to an embodiment of the invention.

FIG. 3 is a schematic diagram of image deformation adjustment according to an embodiment of the invention. Referring to FIG. 3, compared to the embodiment of FIG. 2, the projection image 330 of the embodiment, for example, includes 40 image grid points 331_1-331_40 arranged in an array. The image grid points 331_1-331_40 may be distributed in the projection image 330 according to the image content. Namely, adjustment objects of the image deformation adjustment are not limited to four image corners or image boundaries. It should be noted that the image content of the projection image 330 may be divided into several blocks as shown in FIG. 3, and the plurality of blocks respectively correspond to one sub-image of the projection image 330, and the sub-image of each of the plurality of blocks is deformed accordingly along with a shape change of the corresponding block. Namely, when one of the image grid points 331_1-331_40 of the projection image 330 is moved, the image content of a plurality of sub-images around the one of the image grid points 331_1-331_40 is accordingly deformed.

To be specific, as shown in FIG. 3, the user may select the image grid point 331_3 through the control unit to control the projector to let the image grid point 331_3 up and down. Moreover, when the image grid point 331_3 is moved up and down, the image content of a plurality of sub-images of a plurality of blocks formed by connecting the image grid points 331_1-331_20 around the image grid point 331_3 is accordingly deformed. However, in an embodiment, the user may also select the image grid points 331_8, 331_13 or other image grid points through the control unit to adjust the range of the projection image 330 without being limited to the example of FIG. 3. Namely, the user may adjust the range of the projection image 330 to an expected range of the user by moving positions of one or multiple of the image grid points 331_1-331_40 of the projection image 330, and the image content of the projection image 330 is also accordingly deformed, or even achieve an image scaling effect. In other words, when displacement of any image grid point is adjusted, a part of the predetermined adjacent image grid points are accordingly displaced.

Moreover, the number of the image grid points of the projection image of the invention is not limited to the embodiment of FIG. 2 or FIG. 3. In an embodiment, the projection image may include N*M image grid points arranged in an array, where N and M are respectively an integer greater than or equal to 2. Moreover, distribution positions of the image grid points of the projection image of the invention are not limited to the embodiment of FIG. 2 or FIG. 3. In an embodiment, the image grid points of the projection image may also be arranged in a non-array manner.

Figure 4:
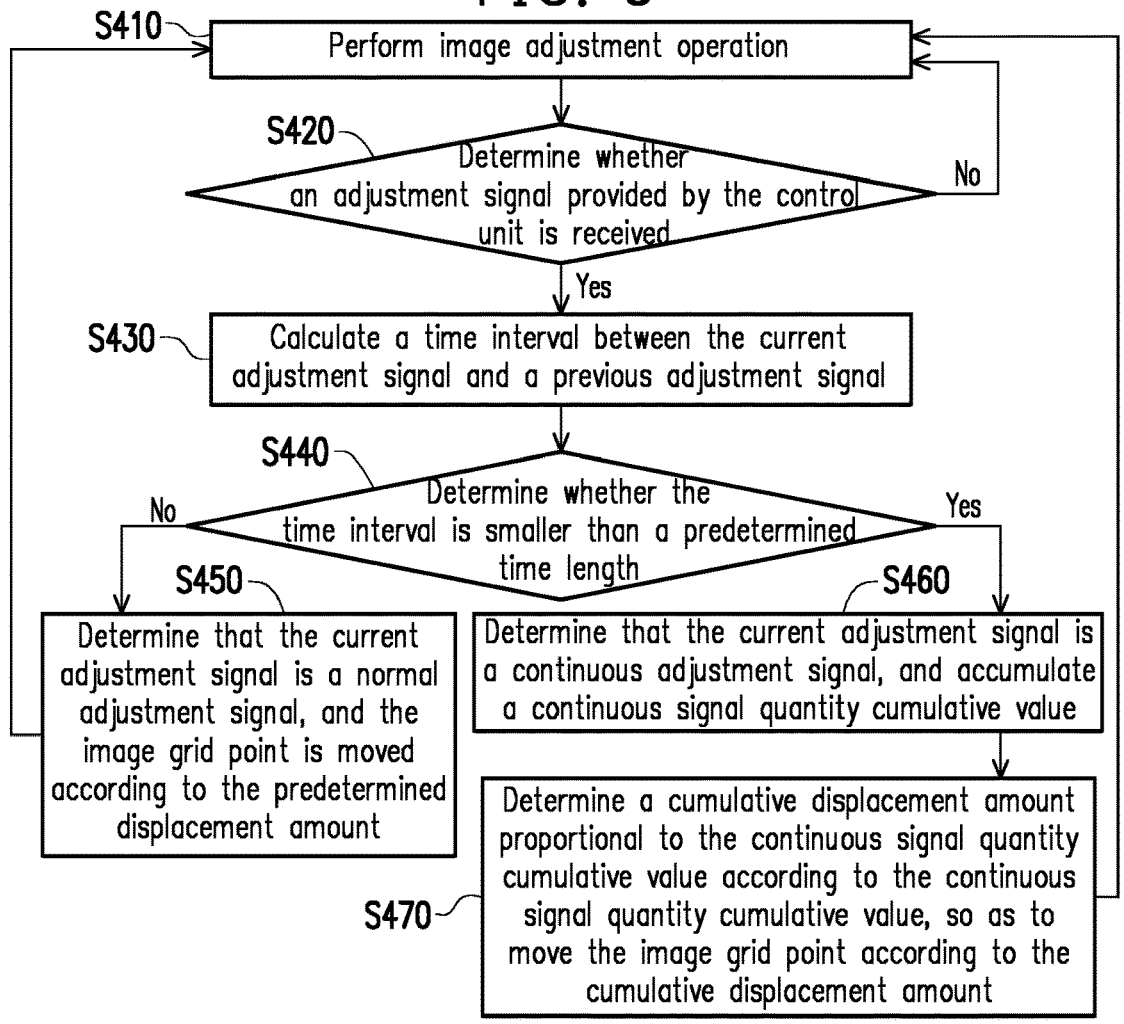
FIG. 4 is an operation flowchart of a projector according to an embodiment of the invention.

FIG. 4 is an operation flowchart of a projector according to an embodiment of the invention. Referring to FIG. 1 and FIG. 4, the operation flow of FIG. 4 is at least adapted to the projector 110 of the embodiment of FIG. 1. In a step S410, when the user operates the projector 110 through the control unit 120, the projection image projected by the projector 110 presents an adjustment image (for example, a projection image 230 or 330 with a plurality of image grid points shown in FIG. 2 or 3), so as to implement adjustment operations of the projection image. In an embodiment, the image grid points are generated by software and presented on the projection image. In a step S420, the control processing unit 112 determines whether the adjustment signal provided by the control unit 120 is received. If not, the projector 110 re-executes the step S410 to maintain the adjustment image, and re-executes the step S420. If yes, the projector 110 executes a step S430. In the step S430, the control processing unit 112 calculates a time interval between the current adjustment signal and a previous adjustment signal.

Then, in a step S440, the control processing unit 112 determines whether the time interval is smaller than a predetermined time length, where the predetermined time length is, for example, 100 ms. If not, the projector 110 executes a step S450. In the step S450, the control processing unit 112 determines that the current adjustment signal is a normal adjustment signal, and moves the image grid point according to the predetermined displacement amount. After the projector 110 completes executing the step S450, the projector 110 re-executes the step S410. If yes, the projector 110 executes a step S460. In the step S460, the control processing unit 112 determines that the current adjustment signal is a continuous adjustment signal, and accumulates a continuous signal quantity cumulative value. In a step S470, the control processing unit 112 determines a cumulative displacement amount proportional to the continuous signal quantity cumulative value according to the continuous signal quantity cumulative value, so as to move the image grid point according to the cumulative displacement amount. After the projector 110 completes executing the step S470, the projector 110 re-executes the step S410.

It should be noted that the continuous signal quantity cumulative value refers to a result that the control processing unit 112 accumulates successively through a continuous counter in the process of continuously receiving the adjustment signals provided by the control unit 120 corresponding to the same direction unit to continuously and cyclically execute the steps 410, 420, 430, 440, 460, and 470. Comparatively, if the user does not continuously press the same direction unit (for example, the continuous pressing is less than 1 second), the continuous signal quantity cumulative value will stop accumulating. Moreover, when a next event of continuously receiving the adjustment signals occurs, the continuous signal quantity cumulative value is recalculated. Therefore, the projector 110 applying the operation flow of the embodiment may provide a convenient projection image adjusting effect.

Moreover, enough instructions, recommendations and descriptions for detailed device characteristics, implementations and technical details of the projector and the control unit of the embodiment may be learned from description of the embodiments of FIG. 1 to FIG. 3, and details thereof are not repeated.

Figure 5:
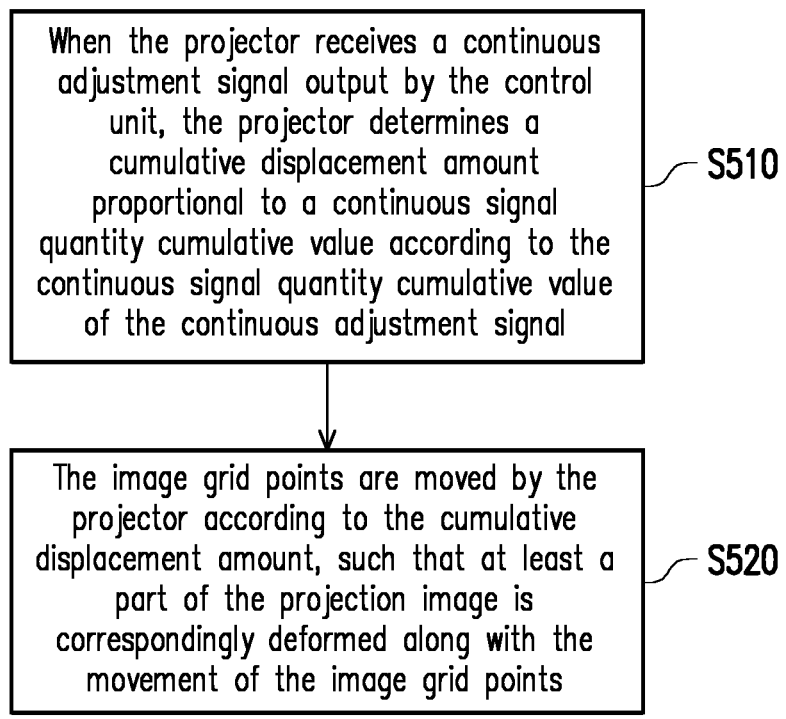
FIG. 5 is a flowchart illustrating a projection image adjusting method according to an embodiment of the invention.

FIG. 5 is a flowchart illustrating a projection image adjusting method according to an embodiment of the invention. Referring to FIG. 1 and FIG. 5, the projection image adjusting method of FIG. 5 may be at least applied to the projection system 100 of the embodiment of FIG. 1. In a step S510, when the projector 110 receives a continuous adjustment signal output by the control unit 120, the projector 110 determines a cumulative displacement amount proportional to a continuous signal quantity cumulative value according to the continuous signal quantity cumulative value of the continuous adjustment signal. In a step S520, the image grid points are moved by the projector 110 according to the cumulative displacement amount, such that at least a part of the projection image is correspondingly deformed along with the movement of the image grid points. Therefore, the projection system 100 applying the projection image adjusting method of the embodiment may provide convenient projection image adjusting effect.

Moreover, enough instructions, recommendations and descriptions for detailed device characteristics, implementations and technical details of the projection system of the embodiment may be learned from description of the embodiments of FIG. 1 to FIG. 4, and details thereof are not repeated.

In summary, the embodiments of the invention have at least one of following advantages or effects. The projection system, the projection image adjusting method and the projector of the invention may provide normal and continuous image grid point adjustment functions. The normal image grid point adjustment function refers to that as the user presses the direction units one by one, the corresponding image grid points are correspondingly displaced by the same predetermined displacement amount. The continuous image grid point adjustment function refers to that as the user continuously presses the direction unit, the corresponding image grid point is continuously displaced by the gradually increased displacement amounts. Namely, when the user wants to adjust a certain image grid point by a long distance, the user may continuously press the direction unit so that the certain image grid point may be quickly moved through the successively increased displacement amounts, so as to effectively shorten an adjustment time, and effectively reduce the number of times for pressing the direction unit. Therefore, the projection system, the projection image adjusting method and the projector of the invention may provide convenient projection image adjusting effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising:
a projector, configured to project a projection image;
a control unit, coupled to the projector, and configured to control a movement of an image grid point of the projection image projected by the projector,
wherein the projector has a first operation mode and a second operation mode,
wherein in the first operation mode, the projector receives a normal adjustment signal output by the control unit, and
in response to receiving the normal adjustment signal in the first operation mode, the image grid point is moved with a fixed predetermined displacement amount by the projector according to at least one normal signal quantity value associated with the normal adjustment signal to correspondingly deform at least a part of the projection image, and
wherein in the second operation mode, the projector receives a continuous adjustment signal output by the control unit,
in response to receiving the continuous adjustment signal in the second operation mode, the projector determines a cumulative displacement amount proportional to continuous signal quantity cumulative values associated with the continuous adjustment signal, and
the image grid point in the second operation mode is rapidly moved by the projector according to the cumulative displacement amount to correspondingly deform at least a part of the projection image,
wherein the continuous signal quantity cumulative values are larger than the at least one normal signal quantity value in the same time length,
wherein the cumulative displacement amount, used for deforming the part of the projection image in the second operation mode, sequentially increases in a manner including at least one of arithmetic progression, geometric progression and a plurality of predetermined increments to rapidly move the image grid point in a large displacement amount.

2. The projection system of claim 1, wherein when the projector receives the normal adjustment signal output by the control unit, one of a plurality of image grid points on the projection image is moved toward an adjustment direction by the projector according to the fixed predetermined displacement amount, wherein the fixed predetermined displacement amount is smaller than the cumulative displacement amount.

3. The projection system of claim 2, wherein the fixed predetermined displacement amount is at least one pixel distance.

4. The projection system of claim 1, wherein the control unit comprises a plurality of direction units, and when one of the direction units is enabled, the control unit controls the projector to let the image grid point of the projection image move toward an adjustment direction corresponding to one of the direction units.

5. The projection system of claim 1, wherein when the projector continuously receives a plurality of continuous adjustment signals corresponding to the same adjustment direction and output by the control unit, the projector sequentially accumulates a plurality of continuous signal quantity cumulative values of the continuous adjustment signals, and the projector sequentially determines a plurality of cumulative displacement amounts respectively proportional to the continuous signal quantity cumulative values according to the continuous signal quantity cumulative values,
wherein the image grid point is continuously moved by the projector according to the cumulative displacement amounts, so that at least a part of the projection image is correspondingly deformed continuously along with continuous movement of the image grid point.

6. The projection system of claim 1, wherein the projector determines whether a time interval between a current adjustment signal and a previous adjustment signal corresponding to the same adjustment direction and output by the control unit is smaller than a predetermined time length, so as to determine the current adjustment signal as the continuous adjustment signal and accumulate the continuous signal quantity cumulative value.

7. The projection system of claim 1, wherein the projection image comprises N*M image grid points arranged in an array, and N and M are respectively an integer greater than or equal to 2, wherein the control unit is configured to select one of the N*M image grid points, so as to control the projector to let a selected image grid point move.

8. A projection image adjusting method, adapted to a projection system, wherein the projection system comprises a projector and a control unit, and the control unit controls movement of an image grid point of a projection image projected by the projector, wherein the projector has a first operation mode and a second operation mode, the projection image adjusting method comprising:
in the first operation mode, using the projector to receive a normal adjustment signal output by the control unit, and
in response to receiving the normal adjustment signal in the first operation mode, moving the image grid point with a fixed predetermined displacement amount by the projector according to at least one normal signal quantity value associated with the normal adjustment signal to correspondingly deform at least a part of projection image, and
in the second operation mode, using the projector to receive a continuous adjustment signal output by the control unit,
in response to receiving the continuous adjustment signal in the second operation mode, using the projector to determine a cumulative displacement amount proportional to continuous signal quantity cumulative values associated with the continuous adjustment signal; and
rapidly moving the image grid point in the second operation mode by the projector according to the cumulative displacement amount to correspondingly deform at least a part of the projection image, wherein the continuous signal quantity cumulative values are larger than the at least one normal signal quantity value in the same time length, wherein the cumulative displacement amount, used for deforming the part of the projection image in the second operation mode, sequentially increases in a manner including at least one of arithmetic progression, geometric progression and a plurality of predetermined increments to rapidly move the image grid point in a large displacement amount.

9. The projection image adjusting method of claim 8, further comprising:

when the projector receives the normal adjustment signal output by the control unit, moving one of a plurality of image grid points on the projection image toward an adjustment direction by the projector according to the fixed predetermined displacement amount, wherein the fixed predetermined displacement amount is smaller than the cumulative displacement amount.

10. The projection image adjusting method of claim 9, wherein the fixed predetermined displacement amount is at least one pixel distance.

11. The projection image adjusting method of claim 8, wherein the control unit comprises a plurality of direction units, and when one of the direction units is enabled, the control unit controls the projector to let the image grid point of the projection image move toward an adjustment direction corresponding to one of the direction units.

12. The projection image adjusting method of claim 8, further comprising:

wherein when the projector continuously receives a plurality of continuous adjustment signals corresponding to the same adjustment direction and output by the control unit, sequentially accumulating a plurality of continuous signal quantity cumulative values of the continuous adjustment signals by the projector;

sequentially determining a plurality of cumulative displacement amounts respectively proportional to the continuous signal quantity cumulative values by the projector according to the continuous signal quantity cumulative values; and sequentially moving the image grid point continuously by the projector according to the cumulative displacement amounts, so that at least a part of the projection image is correspondingly deformed continuously along with continuous movement of the image grid point.

13. The projection image adjusting method of claim 8, further comprising:

determining whether a time interval between a current adjustment signal and a previous adjustment signal corresponding to the same adjustment direction and output by the control unit is smaller than a predetermined time length by the projector, so as to determine the current adjustment signal as the continuous adjustment signal and accumulate the continuous signal quantity cumulative value.

14. The projection image adjusting method of claim 8, wherein the projection image comprises N*M image grid points arranged in an array, and N and M are respectively an integer greater than or equal to 2, wherein the control unit is configured to select one of the N*M image grid points, so as to control the projector to let a selected image grid point move.

15. A projector, comprising:

a projection optical engine, configured to project a projection image;

a control processing unit, coupled to the projection optical engine, and configured to control movement of an image grid point of the projection image projected by the projection optical engine, wherein the projection optical engine has a first operation mode and a second operation mode, wherein in the first operation mode, the control processing unit receives a normal adjustment signal output by a control unit, and in response to receiving the normal adjustment signal in the first operation mode, the image grid point is moved with a fixed predetermined displacement amount by the control processing unit according to at least one normal signal quantity value associated with the normal adjustment signal to correspondingly deform at least a part of the projection image, and wherein in the second operation mode, the control processing unit receives a continuous adjustment signal output by the control unit, in response to receiving the continuous adjustment signal in the second operation mode, the control processing unit determines a cumulative displacement amount proportional to continuous signal quantity cumulative values associated with the continuous adjustment signal, and the image grid point in the second operation mode is rapidly moved by the control processing unit according to the cumulative displacement amount to correspondingly deform at least a part of the projection image, wherein the continuous signal quantity cumulative values are larger than the at least one normal signal quantity value in the same time length, wherein the cumulative displacement amount, used for deforming the part of the projection image in the second operation mode, sequentially increases in a manner including at least one of arithmetic progression, geometric progression and a plurality of predetermined increments to rapidly move the image grid point in a large displacement amount.

16. The projector of claim 15, wherein when the control processing unit receives a normal adjustment signal output by the control unit, one of a plurality of image grid points on the projection image is moved toward an adjustment direction by the projector according to the fixed predetermined displacement amount, wherein the fixed predetermined displacement amount is smaller than the cumulative displacement amount.

17. The projector of claim 16, wherein the fixed predetermined displacement amount is at least one pixel distance.

18. The projector of claim 15, wherein the control unit comprises a plurality of direction units, and when the control processing unit determines that one of the direction units is enabled, the image grid point of the projection image is moved by the control processing unit toward an adjustment direction corresponding to one of the direction units.

19. The projector of claim 15, wherein when the control processing unit continuously receives a plurality of continuous adjustment signals corresponding to the same adjustment direction and output by the control unit, the control processing unit sequentially accumulates a plurality of continuous signal quantity cumulative values of the continuous adjustment signals, and the control processing unit sequentially determines a plurality of cumulative displacement amounts respectively proportional to the continuous signal quantity cumulative values according to the continuous signal quantity cumulative values, wherein the image grid point is continuously moved by the control processing unit according to the cumulative displacement amounts, so that at least a part of the projection image is correspondingly deformed continuously along with continuous movement of the image grid point.

20. The projector of claim 15, wherein the control processing unit determines whether a time interval between a current adjustment signal and a previous adjustment signal corresponding to the same adjustment direction and output by the control unit is smaller than a predetermined time length, so as to determine the current adjustment signal as the continuous adjustment signal and accumulate the continuous signal quantity cumulative value.

21. The projector of claim 15, wherein the projection image comprises N*M image grid points arranged in an array, and N and M are respectively an integer greater than or equal to 2, wherein the control processing unit determines whether the control unit selects one of the N*M image grid points, so as to correspondingly move a selected image grid point.

* * * * *